Oct. 19, 1943. F. W. OPP 2,332,164
ELECTRICAL TREATMENT OF PLANTS
Filed Aug. 16, 1940
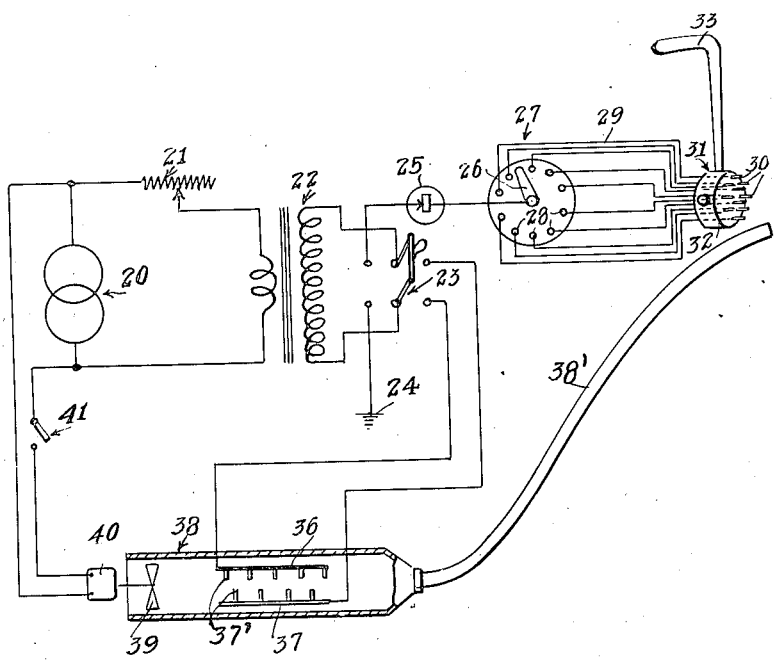
Inventor
Fred W. Opp
By Lyon & Lyon
Attorneys Patented Oct. 19, 1943

2,332,164

UNITED STATES PATENT OFFICE 2,332,164

ELECTRICAL TREATMENT OF PLANTS

Fred W. Opp, Costa Mesa, Calif., assignor of two-ninths to Walter C. Collins, two-ninths to Clyde W. Catlin, and two-ninths to Frederick C. Wright, all of Santa Ana, Calif.

Application August 16, 1940, Serial No. 352,909

1 Claim. (Cl. 47—1.3)

This invention relates to electrical treatment of plants for the purpose of either directly stimulating the growth of the plants, or to indirectly stimulate the growth of the plants by destroying diseases or pests that afflict the plants.

A general object of the invention is to provide a particularly effective method of treating certain plant virus diseases, such as Psorosis of citrus trees.

The present invention is based upon the basic discovery that producing a flow of electric current in one direction longitudinally (parallel with the sap flow) through a plant has a growth-stimulating effect, whereas a current flow in the opposite direction has an inhibiting effect on not only the plant cells themselves, but on foreign cells, bacteria or viruses that may be in the plant. In accordance with the discovery, I am able to selectively apply current to plants in such a way as to either stimulate the growth of the plant or to inhibit the growth of foreign organisms within the plant which are toxic or harmful to the plant.

A full understanding of the invention may be had from the following detailed description, with reference to the drawing, of certain specific procedures that may be employed, it being understood that the invention is not limited to the particular procedures disclosed.

The single figure of the drawing is a schematic diagram illustrating a method of treating scaly bark and similar diseases of trees; it comprises applying an electrical discharge to a plant in such a way that it is inhibitory of plant growth and disease growth and is useful in treating diseases such as scaly bark or Psorosis of citrus trees.

Thus, there is disclosed an alternator 20 adapted to be connected through a rheostat 21 to the primary winding of a step-up transformer 22. The secondary winding of the transformer is adapted to be connected by a double pole double throw switch 23 between a ground electrode 24 and one terminal of a half wave rectifier 25. The other pole of the rectifier 25 is connected to the movable contact 26 of a distributor 27, which is adapted to move over a plurality of fixed contacts 28, each connected by a wire 29 to a different point 30 of a multiple electrode element 31. Thus the different electrodes 30 may be mounted in an insulated support 32, to which there is secured a handle 33 to facilitate manipulation.

With the switch 23 thrown into leftmost position to connect the secondary of the transformer 22 as described, and with the rotary distributor 27 in operation, a high potential is successively applied between the ground 24 and each of the electrodes 30. The rectifier 25 is so poled that the electrodes 30 are positively charged. The assembly 31 is then moved back and forth over the diseased area 35 of the bark of the tree being treated, so that spark discharges occur between the electrodes 30 and the tree. These sparks penetrate the bark of the tree, forming a large number of punctures and tending to kill the diseased tissues of the bark.

The reason for employing the distributor 27 is to permit concentration of all the energy obtainable from the transformer 22 on a single electrode and thereby increase the intensity of the discharge. Otherwise, either only a single electrode could be employed at a time, or the alternator 20 and the transformer 22 would have to be of very large capacity. The alternator may supply 5 amperes at 120 volts, and the secondary winding of the transformer may supply 40 milliamperes at 15,000 volts.

After the diseased area 35 of the tree has been treated by the spark discharge, as described, the switch 23 is thrown to disconnect the transformer 22 from the ground terminal 24 and the rectifier 25 and connect it to the two plates 36 and 37 of an ozone generator 38. A fan 39, which may be driven by a motor 40 energized through a switch 41 from the alternator 20, may be employed to blow a current of air past the plates 36 and 37. This air is conducted through a hose 38' which is directed onto the diseased area 35 of the bark of the tree, after it has been treated with the spark discharge, as previously described.

The plates 36 and 37 may, to advantage, be equipped with points 37' to set up an electrical discharge that produces substantial amounts of ozone in the air delivered through the ozone generator to the hose 41. This ozone is discharged onto the bark area 35 and penetrates through the punctures in the bark produced by the spark discharge and thereby has an additional sterilizing effect on the diseased area.

Although for the purpose of explaining the invention a specific embodiment thereof has been described in detail, it will be understood by those skilled in the art that various changes can be made from the specific apparatus shown, without departing from the invention, which is to be limited only to the extent set forth in the appended claim.

I claim:

Apparatus for treating diseased plants, comprising an electrode having a plurality of separate sparking contacts thereon, said electrode being adapted to be positioned adjacent the plant area to be treated, means including a source of potential, and a distributor for successively applying unidirectional potential between ground and said different terminals of said electrodes in rapid succession.

FRED W. OPP.